(12) United States Patent
Vetorino et al.

(10) Patent No.: US 6,827,475 B2
(45) Date of Patent: Dec. 7, 2004

(54) LED LIGHT COLLECTION AND UNIFORM TRANSMISSION SYSTEM

(76) Inventors: Steven Robert Vetorino, 745 S. Grand Ave., Fort Lupton, CO (US) 80621; Russell E. Sibell, 1490 W. 116th Ave., #38, Denver, CO (US) 80234

( * ) Notice: Subject to any disclaimer, the term of this patent is extended or adjusted under 35 U.S.C. 154(b) by 141 days.

(21) Appl. No.: 10/365,241

(22) Filed: Feb. 12, 2003

(65) Prior Publication Data

US 2004/0046489 A1 Mar. 11, 2004

Related U.S. Application Data

(60) Provisional application No. 60/409,265, filed on Sep. 9, 2002.

(51) Int. Cl.$^7$ ................................................ F21S 4/00
(52) U.S. Cl. ....................... 362/800; 362/545; 362/555; 362/328; 362/309
(58) Field of Search ................................. 362/800, 335, 362/326, 551, 555, 328, 545, 244, 309, 332; 359/708, 710, 711, 726; 313/113, 512

(56) References Cited

U.S. PATENT DOCUMENTS

| | | | |
|---|---|---|---|
| 2,080,352 A | * | 5/1937 | Weisse ........................... 356/3 |
| 4,155,626 A | * | 5/1979 | Grech ........................... 359/480 |
| 4,254,453 A | | 3/1981 | Mouyard et al. ............. 362/240 |
| 4,257,672 A | | 3/1981 | Balliet ....................... 350/96.17 |
| 4,327,972 A | * | 5/1982 | Brunsting .................... 362/335 |
| 4,733,335 A | | 3/1988 | Serizawa ....................... 362/80 |
| 4,767,172 A | | 8/1988 | Nichols et al. ........... 350/96.18 |
| 5,013,144 A | | 5/1991 | Silverglate et al. .......... 350/435 |
| 5,033,833 A | * | 7/1991 | Brown ........................ 359/728 |
| 5,174,649 A | | 12/1992 | Alston ......................... 362/244 |
| 5,428,509 A | | 6/1995 | Dassanayake ................. 362/32 |
| 5,485,317 A | | 1/1996 | Perissinotto et al. ........ 359/712 |
| 5,600,492 A | | 2/1997 | Tanaka et al. ............... 359/712 |
| 5,894,196 A | | 4/1999 | McDermott ................. 313/512 |
| 5,898,267 A | | 4/1999 | McDermott ................. 313/512 |
| 5,918,968 A | * | 7/1999 | Choi ........................... 362/268 |
| 6,019,493 A | | 2/2000 | Kuo et al. ................... 362/800 |
| 6,061,160 A | | 5/2000 | Maruyama ................... 359/152 |
| 6,115,184 A | | 9/2000 | Hubble, III et al. ......... 359/627 |
| 6,283,613 B1 | | 9/2001 | Schaffer ...................... 362/245 |
| 2001/0017604 A1 | * | 8/2001 | Jacobsen et al. ............... 345/27 |
| 2002/0084462 A1 | | 7/2002 | Tamai et al. |
| 2002/0105268 A1 | | 8/2002 | Schliep et al. |
| 2002/0105801 A1 | * | 8/2002 | Martineau .................... 362/244 |
| 2003/0058641 A1 | * | 3/2003 | Watanabe et al. ............ 362/235 |

FOREIGN PATENT DOCUMENTS

JP      10288966      10/1998

* cited by examiner

Primary Examiner—Thomas M. Sember
Assistant Examiner—Hargobind S. Sawhney
(74) Attorney, Agent, or Firm—Jennifer L. Bales; Macheledt Bales & Heidnuller

(57) ABSTRACT

Apparatus for collecting light from an LED and transmitting it in a near-uniform column incudes a conical reflector about the base of the LED for collecting light emitted to the sides of the LED, and a lens specially designed to focus the collected light into a near-collimated beam. The lens has opposite, substantially elliptical surfaces to collect and collimate the rapidly diverging light from the LED and the reflector, and each lens surface includes a flat spot to prevent shadows from forming, thereby producing a more uniform beam.

18 Claims, 3 Drawing Sheets

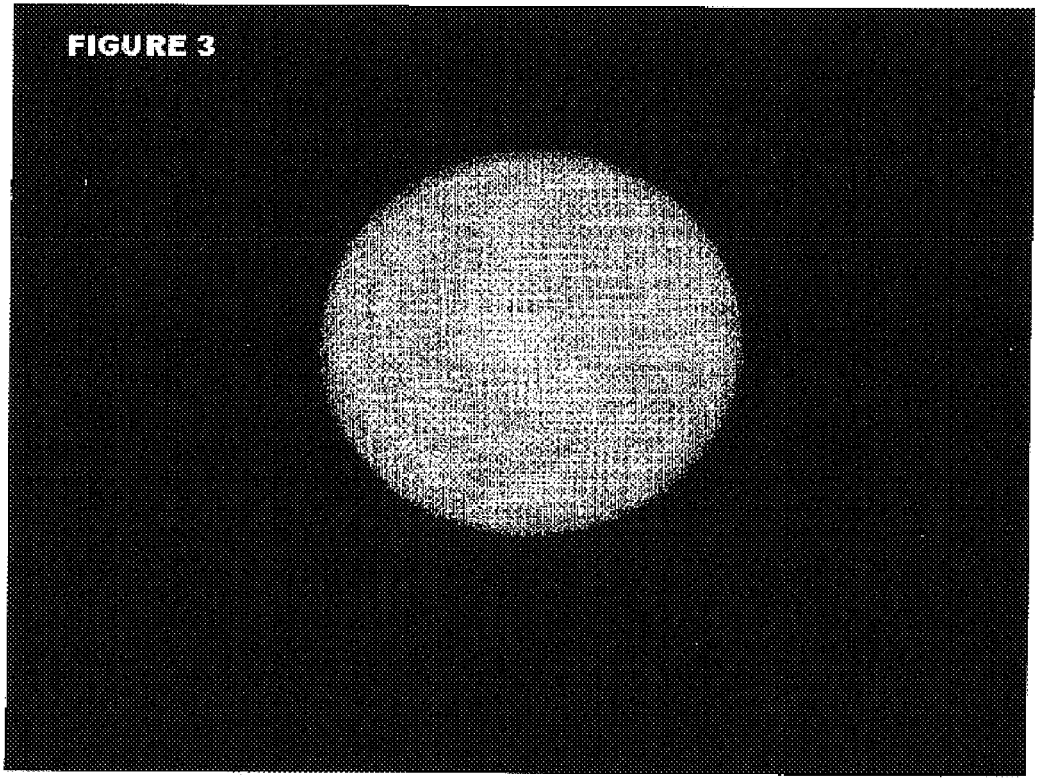

LED LIGHT COLLECTION AND UNIFORM TRANSMISSION SYSTEM

This application claims benefit of U.S. Provisional Patent Application No. 60/409,265, Filed Sep. 9, 2002.

BACKGROUND OF THE INVENTION

1. Field of the Invention

The present invention relates to apparatus and methods for collecting light from a Light Emitting Diode (LED) and transmitting it in a uniform manner.

2. Description of the Prior Art

LEDs are increasingly used in a number of devices as a light source. They are small and efficient, and last a long time. For example, several flashlights utilizing LEDs are available. See for example, U.S. Pat. Nos. 5,957,714 and 6,220,719, both having a common inventor with the present invention.

Devices that use LEDs as light sources generally include some method of collecting and/or focusing the light, as light from LEDs is diffuse. FIG. 1 shows a typical LED and the light it generates. A number of prior art devices include a combined reflector and refractor element to collect and transmit the light from an LED. See for example U.S. Pat. No. 5,898,267.

Most devices include optics which image the LED onto a plane in front of the LED. However, with devices such as flashlights, what is desired is not an image of the LED, but rather a column of uniform light.

Some prior art references appreciate this point. For example, a number of known devices use an array of LEDs, and often an array of lenses, to generate a column of light rather than a point source. See for example U.S. Pat. No. 6,283,613.

A need remains in the art for apparatus and methods for providing concentrated uniform light from a single LED.

SUMMARY

The present invention comprises three important elements:

(1) the LED;

(2) A conical reflector for collecting light emitted to the sides of the LED; and (3) A lens specially designed to focus the collected light into a near-collimated beam.

The LED is generally a conventional LED of the kind having a base, a light element and a domed transparent plastic housing attached to the base and covering the light element. Such an LED produces a bright band of light at the apex of its plastic housing, because of total internal reflection inside the plastic. This light is generally wasted. The reflector has a highly reflecting inside surface. Preferably, the reflector is a cone with about a 70° angle. This configuration redirects the sideband light from the LED forward.

The lens is specially designed and configured to focus the light directly from the LED and the light reflected from the reflector into a near-collimated uniform beam. The lens has two important features. First, it includes a flat spot in the center of each of its curved surfaces. This prevents the lens from imaging the LED emitter and forming a dark spot in the beam. Consequently, the lens projects a field of near-uniform light. Second, the curved surfaces are elliptical rather than spherical to catch and nearly collimate the quickly diverging light from LED.

The flat spots 4 are preferably designed according to the following equation:

$$0.05d \leq s \leq 0.1d,$$

where s is the diameter of the flat spots, and d is the distance from the front of the LED to the center of the lens. The flat spot produces a near-uniform beam, rather than an image of the LED (with light and dark spots) that is produced by a conventional lens.

The elliptical curvature of the two curved surfaces of the lens is required to catch and nearly collimate the quickly diverging light from the LED. Preferably, the major axis of the ellipse is less than 0.7 times the distance d. Finally, the distance between the center of the ellipses should be about s, the diameter of the flat spots.

In one example, the lens is formed of plastic, and thickness of the lens at an edge is about one third the thickness of the lens at the center. In this example, (d) is approximately 1 inch, the half thickness of the lens is about 0.24 inches, the half diameter (if the elliptical sides were extended to meet) is about 0.70 inches, and edge thickness of the lens is about 0.16 inches.

BRIEF DESCRIPTION OF THE DRAWINGS

FIG. 3 is an image of the uniform field of light generated by the apparatus of FIG. 2.

DETAILED DESCRIPTION OF THE PREFERRED EMBODIMENT

Figure 1:
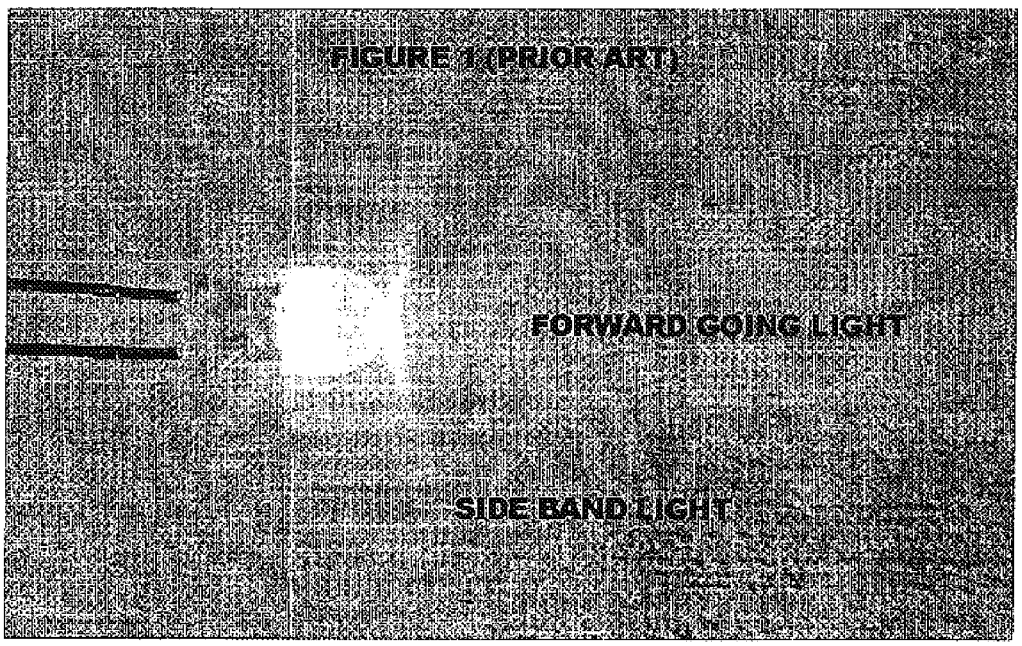
FIG. 1 (prior art) is an image showing the light generated by a conventional LED.
Figure 2:
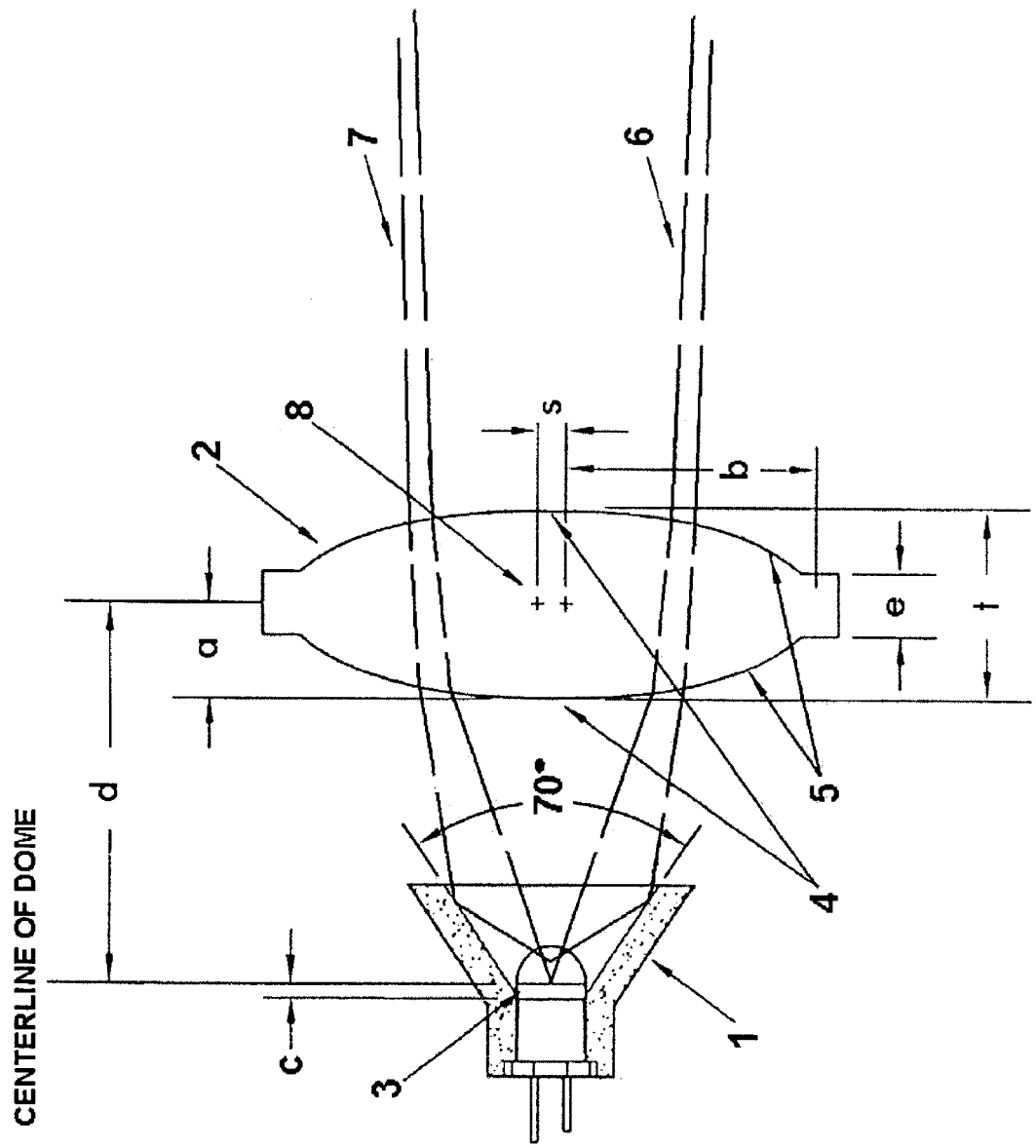
FIG. 2 is a side schematic view of LED light collecting and transmitting apparatus according to the present invention.

FIG. 2 is a side schematic view of LED light collecting and transmitting apparatus according to the present invention. The present invention comprises three important elements:

(1) LED 3;

(2) conical reflector 1 for collecting light emitted to the sides of LED 3; and (3) lens 2 specially designed to focus the collected light into a near-collimated beam LED 3 is generally a conventional LED of the kind having a base, a light element and a domed transparent plastic housing attached to the base and covering the light element. Such an LED produces a bright band of light at the apex of its plastic housing, because of total internal reflection inside the plastic. This light is generally wasted. FIG. 1 (prior art) illustrates the light generated by a typical LED.

Reflector 1 has a highly reflecting inside surface. Preferably, the reflector is a cone with about a 70° angle. This configuration redirects the sideband light from LED 3 forward. Reflector 1 can be metal or plastic with a polished reflecting surface. If made of plastic, a metallic coating needs to be applied to the inside surface. When placed about the LED it redirects side band light in a forward direction. A bright shaped oval of light at the apex of LED 3's plastic housing is produced by total internal reflection inside the plastic. The light emitted from this bright spot exits the LED nearly perpendicular to the normal forward going light. The side band light has between 10 and 20% of the light output power of the forward going light. If no reflector is used, this light is wasted.

Returning to FIG. 2, conical reflector 1 preferably has about a 70-degree cone angle to redirect the side band light forward through lens 3. The axial position of diode 3 inside reflector 1 determines how much light is collected and where it will overlap the forward going light. Preferably the conical reflecting surface should intersect LED 3 0.04 inches below the centerline of the hemispherical dome of the LED housing in order to optimize light gathering and beam overlap. This distance is designated (c) in FIG. 1.

Reflector 1, as described above, will place side band light on top of the forward going light approximately 10 feet in front of the lens. This increases the brightness of the output beam and enhances the efficiency of any LED illumination device by utilizing as much of the light generated as possible.

Lens 2 is specially designed and configured to focus the light directly from LED 3 and the light reflected from reflector 1 into a near-collimated substantially uniform beam 6. The lens has two important features. First, it includes a flat spot 4 in the center of each of its curved surfaces 5. Second, the curved surfaces 5 are elliptical rather than spherical. The separation between the ellipse centers equals the flat spot diameters.

The flat spots 4 are preferably designed according to the following equation:

$$0.05d \leq s \leq 0.1d,$$

where (s) is the diameter of flat spot 4 and (d) is the distance from the centerline of LED 3 to the center of lens 1. The diameter (s) of flat spots 4 generally should not be less than 5% or greater than 10% of the separation distance, for best performance. The flat spot produces a near-uniform beam, rather than an image of the LED (with light and dark spots) as is produced by a conventional lens.

The elliptical curvature of the two curved surfaces 5 of lens 1 is required to catch and nearly collimate the quickly diverging light from LED 3. Most lenses have spherical surfaces, but this type of lens cannot catch and collimate the quickly diverging light from LED 3. The elliptical curvature of surfaces 5 becomes more pronounced with increasing radius allowing the elliptical lens to better collimate this light.

Preferably, the major axis of the ellipse is less than 0.7 times the distance d. In addition, the distance between the center of the ellipses should be about (s), the diameter of the flat spots.

The equation which describes an elliptical surface is:

$$\frac{x^2}{(a)^2} + \frac{y^2}{(b)^2} = 1,$$

where (a) is the length of the minor axis or one half the thickness of lens 2, and (b) is the length of the major axis or one half the diameter of the lens, if the curvatures on both sides were allowed to meet. So, the equation which describes the relationship between the diode/lens separation distance and the major axis is:

$$(b) \geq (0.7)(d),$$

where (d) is the distance from LED 3 to the center of lens 2.

This equation states that in order to sufficiently collect the light from the LED/Reflector assembly, the major axis of each elliptical surface of the lens must be equal to or greater than about 70% of the separation distance between the LED and the center of the lens. A major axis less than this value will result in a loss of forward projected light due to beam clipping.

In order to produce a more collimated beam of light for any given separation distance (d), the minor axis must be increased. If the lens is made from plastic using injection mold fabrication processes, the ratio of edge thickness (e) to center thickness should not exceed 3 to 1 in order to avoid surface depressions. This ratio gives an upper limit for the lens thickness for any given edge thickness. Based on this, if the separation between LED 3 and lens center is 1 inch and the edge thickness of the lens is 0.16 inches, the equation that describes the elliptical surfaces of the lens is:

$$\frac{x^2}{(0.24)^2} + \frac{y^2}{(0.70)^2} = 1$$

As a final key point, a distance equal to the diameter of the flat spots preferably separates the centers of the ellipses. A lens 2 with these design features will effectively collect and nearly collimate the forward and reflected light produced by the LED/reflector assembly.

FIG. 3 is an image of the near-uniform field of light 6 generated by the apparatus of FIG. 2. The beam was shining on a surface 24 inches from the lens. The central high intensity beam is approximately 8 inches in diameter; the outer field of light is approximately 18 inches in diameter.

What is claimed is:

1. Apparatus for collecting and transmitting light in a near-uniform column from an LED of the type having a base, a light element and a domed transparent plastic housing attached to the base and covering the light element, the apparatus comprising:

a conical reflector disposed about the base of the LED for collecting sideband light from the LED light element and transmitting it forward;

a lens disposed opposite and apart from the housing of the LED for focusing the direct and reflected light from the LED, wherein the distance between the center of the lens and the center of the domed housing on the LED is (d);

wherein the lens is bounded by two opposite, substantially elliptical surfaces, where (a) is the half thickness of the lens and (b) is the half diameter of the lens and wherein each surface includes a flat spot having diameter (s).

2. The apparatus of claim 1 wherein flat spot diameter (s) is between about 5% and 10% of separation distance (d).

3. The apparatus of claim 1 wherein the conical reflector forms a cone angle of about 70°.

4. The apparatus of claim 1 wherein the conical reflector is formed of metal.

5. The apparatus of claim 1 wherein the conical reflector is formed of metal coated plastic.

6. The apparatus of claim 1 wherein the conical reflector intersects the LED at an offset distance (c) of about 0.4 inches from the center of the domed housing on the LED toward the base.

7. The apparatus of claim 1 wherein the half diameter (b) of the lens is greater than or equal to about 70% of separation distance (d).

8. The apparatus of claim 1 wherein the half thickness of the lens (a) is approximately equal to the spot diameter (s).

9. The apparatus of claim 1 wherein the lens is formed of plastic, and thickness of the lens at an edge (e) is about one third thickness of the lens at the center.

10. The apparatus of claim 1 wherein (d) is approximately 1 inch, half thickness (a) is about 0.24 inches, half diameter (b) is about 0.70 inches, and edge thickness (e) of the lens is about 0.16 inches.

11. Apparatus for collecting and transmitting light in a near-uniform column from an LED of the type having a base, a light element and a domed transparent plastic housing attached to the base and covering the light element, the apparatus comprising:

a conical reflector disposed about the base of the LED for collecting sideband light from the LED light element and transmitting it forward;

a lens disposed opposite and apart from the housing of the LED for focusing the direct and reflected light from the LED, wherein the distance between the center of the lens and the center of the domed housing on the LED is (d);

wherein the lens is bounded by two opposite, substantially elliptical surfaces, where (a) is the half thickness of the lens and (b) is the half diameter of the lens and wherein each surface includes a flat spot having diameter (s); and wherein flat spot diameter (s) is between about 5% and 10% of separation distance (d).

12. The apparatus of claim 11 wherein the conical reflector forms a cone angle of about 70°.

13. The apparatus of claim 1 wherein the conical reflector intersects the LED at an offset (c) of about 0.4 inches from the center of the domed plastic housing toward the base.

14. The apparatus of claim 11 wherein the half diameter (b) of the lens is greater than or equal to about 70% of separation distance (d).

15. The apparatus of claim 11 wherein the half thickness of the lens (a) is approximately equal to the spot diameter (s).

16. Apparatus for collecting and transmitting light in a near-uniform column from an LED of the type having a base, a light element and a domed transparent plastic housing attached to the base and covering the light element, the apparatus comprising:

a conical reflector disposed about the base of the LED for collecting sideband light from the LED light element and transmitting it forward;

a lens disposed opposite and apart from the housing of the LED for focusing the direct and reflected light from the LED, wherein the distance between the center of the lens and the center of the domed housing of the LED is (d);

wherein the lens is bounded by two opposite, substantially elliptical surfaces, where (a) is the half thickness of the lens and (b) is the half diameter of the lens and wherein each surface includes a flat spot having diameter (s);

wherein flat spot diameter (s) is between about 5% and 10% of separation distance (d); and wherein the half diameter (b) of the lens is greater than or equal to about 70% of separation distance (d).

17. The apparatus of claim 11 wherein the conical reflector forms a cone angle of about 70°.

18. The apparatus of claim 16 wherein the half thickness of the lens (a) is approximately equal to the spot diameter (s).

* * * * *